US010666326B2

(12) United States Patent
Rofougaran et al.

(10) Patent No.: US 10,666,326 B2
(45) Date of Patent: *May 26, 2020

(54) CONTROLLED POWER TRANSMISSION IN RADIO FREQUENCY (RF) DEVICE NETWORK

(71) Applicant: MOVANDI CORPORATION, Newport Beach, CA (US)

(72) Inventors: Ahmadreza Rofougaran, Newport Beach, CA (US); Seunghwan Yoon, Irvine, CA (US)

(73) Assignee: MOVANDI CORPORATION, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,326

(22) Filed: Aug. 24, 2018

(65) Prior Publication Data

US 2019/0181916 A1 Jun. 13, 2019

Related U.S. Application Data

(63) Continuation of application No. 15/835,971, filed on Dec. 8, 2017, now Pat. No. 10,090,887.

(51) Int. Cl.
*H04B 5/00* (2006.01)
*H02J 50/50* (2016.01)
(Continued)

(52) U.S. Cl.
CPC ............ *H04B 5/0037* (2013.01); *H02J 50/20* (2016.02); *H02J 50/40* (2016.02); *H02J 50/50* (2016.02); *H04B 7/0617* (2013.01); *H04W 76/10* (2018.02)

(58) Field of Classification Search
CPC ........ H04B 5/0037; H02J 50/50; H02J 50/20; H03J 50/40; H04W 76/10; H04W 7/0617
See application file for complete search history.

(56) References Cited

U.S. PATENT DOCUMENTS 5,561,850 A 10/1996 Makitalo et al.
5,598,173 A 1/1997 Forti et al.
(Continued)

OTHER PUBLICATIONS

Baggett, Benjamin M.W. Optimization of Aperiodically Spaced Phased Arrays for Wideband Applications. MS Thesis. Virginia Polytechnic Institute and State University, 201t pp. 1-137.
(Continued)

*Primary Examiner* — Sonny Trinh
(74) *Attorney, Agent, or Firm* — Chip Law Group

(57) ABSTRACT

In a first radio frequency (RF) device, circuits determine a non-line-of-sight (NLOS) radio path, and select a first plurality of reflector devices associated with the NLOS radio path from a second plurality of reflector devices. The first plurality of reflector devices, are selected based on a first set of criteria, includes an active reflector device and a passive reflector device, and are controlled to transmit a plurality of RF signals to a second RF device based on a second set of criteria. The second RF device is associated with electronic devices. The first RF signal interferes with a second RF signal of the RF signals. A first type of signal associated with the plurality of RF signals is converted to a second type of signal at the second RF device, and the second type of signal is transmitted by the second RF device to the one or more electronic devices.

25 Claims, 5 Drawing Sheets

(51) Int. Cl.
*H02J 50/20* (2016.01)
*H02J 50/40* (2016.01)
*H04B 7/06* (2006.01)
*H04W 76/10* (2018.01)

(56) References Cited

U.S. PATENT DOCUMENTS

| | | |
|---|---|---|
| 5,666,124 A | 9/1997 | Chethik et al. |
| 5,905,473 A | 5/1999 | Taenzer |
| 5,940,033 A | 8/1999 | Locher et al. |
| 6,018,316 A | 1/2000 | Rudish et al. |
| 6,307,502 B1 | 10/2001 | Marti-Canales et al. |
| 6,405,018 B1 | 6/2002 | Reudink et al. |
| 6,433,920 B1 | 8/2002 | Welch et al. |
| 6,456,252 B1 | 9/2002 | Goyette |
| 6,577,631 B1 | 6/2003 | Keenan et al. |
| 6,718,159 B1 | 4/2004 | Sato |
| 7,020,482 B2 | 3/2006 | Medvedev et al. |
| 7,058,367 B1 | 6/2006 | Luo et al. |
| 7,187,949 B2 | 3/2007 | Chang et al. |
| 7,248,841 B2 | 7/2007 | Agee et al. |
| 7,363,058 B2 | 4/2008 | Gustaf |
| 7,574,236 B1 | 8/2009 | Mansour |
| 7,636,573 B2 | 12/2009 | Walton et al. |
| 7,911,985 B2 | 3/2011 | Proctor, Jr. et al. |
| 7,920,889 B2 | 4/2011 | Hoshino et al. |
| 7,986,742 B2 | 7/2011 | Ketchum et al. |
| 8,014,366 B2 | 9/2011 | Wax et al. |
| 8,190,102 B2 | 5/2012 | Rofougaran |
| 8,314,736 B2 | 11/2012 | Moshfeghi |
| 8,385,305 B1 | 2/2013 | Negus et al. |
| 8,482,462 B2 | 7/2013 | Komijani et al. |
| 8,570,988 B2 | 10/2013 | Wallace et al. |
| 8,644,262 B1 | 2/2014 | Sun et al. |
| 8,654,815 B1 | 2/2014 | Forenza et al. |
| 8,744,513 B2 | 6/2014 | Chen et al. |
| 8,885,628 B2 | 11/2014 | Palanki et al. |
| 9,037,094 B2 | 5/2015 | Moshfeghi |
| 9,252,908 B1 | 2/2016 | Branlund |
| 9,456,354 B2 * | 9/2016 | Branlund ............ H04W 16/28 |
| 9,698,948 B2 | 7/2017 | Moshfeghi |
| 9,787,103 B1 | 10/2017 | Leabman et al. |
| 9,829,563 B2 * | 11/2017 | Xiao ..................... G01S 5/14 |
| 10,069,555 B2 * | 9/2018 | Islam ................. H04B 7/0639 |
| 10,560,179 B2 | 2/2020 | Gharavi et al. |
| 2002/0034958 A1 | 3/2002 | Oberschmidt et al. |
| 2003/0012208 A1 | 1/2003 | Bernheim et al. |
| 2003/0090418 A1 | 5/2003 | Howell |
| 2003/0129989 A1 | 7/2003 | Gholmieh et al. |
| 2004/0116129 A1 | 6/2004 | Wilson |
| 2004/0166808 A1 | 8/2004 | Hasegawa et al. |
| 2005/0048964 A1 | 3/2005 | Cohen et al. |
| 2005/0134517 A1 | 6/2005 | Gottl |
| 2005/0136943 A1 | 6/2005 | Banerjee et al. |
| 2005/0181755 A1 | 8/2005 | Hoshino et al. |
| 2005/0237971 A1 | 10/2005 | Skraparlis |
| 2005/0243756 A1 | 11/2005 | Cleveland et al. |
| 2005/0270227 A1 | 12/2005 | Stephens |
| 2006/0063494 A1 | 3/2006 | Zhang et al. |
| 2007/0001924 A1 | 1/2007 | Hirabayashi |
| 2007/0040025 A1 | 2/2007 | Goel et al. |
| 2007/0052519 A1 | 3/2007 | Talty et al. |
| 2007/0066254 A1 | 3/2007 | Tsuchie et al. |
| 2007/0100548 A1 | 5/2007 | Small |
| 2007/0280310 A1 | 12/2007 | Muenter et al. |
| 2008/0167049 A1 | 7/2008 | Karr et al. |
| 2008/0225758 A1 | 9/2008 | Proctor et al. |
| 2008/0315944 A1 | 12/2008 | Brown |
| 2009/0028120 A1 | 1/2009 | Lee |
| 2009/0093265 A1 | 4/2009 | Kimura et al. |
| 2009/0156227 A1 | 6/2009 | Frerking et al. |
| 2009/0224137 A1 | 9/2009 | Hoermann |
| 2009/0233545 A1 | 9/2009 | Sutskover et al. |
| 2009/0325479 A1 | 12/2009 | Chakrabarti et al. |
| 2010/0080197 A1 | 4/2010 | Kanellakis et al. |
| 2010/0105403 A1 | 4/2010 | Lennartson et al. |
| 2010/0117890 A1 | 5/2010 | Vook et al. |
| 2010/0124895 A1 | 5/2010 | Martin et al. |
| 2010/0149039 A1 | 6/2010 | Komijani et al. |
| 2010/0172309 A1 | 7/2010 | Forenza et al. |
| 2010/0220012 A1 | 9/2010 | Reede |
| 2010/0273504 A1 | 10/2010 | Bull et al. |
| 2010/0284446 A1 | 11/2010 | Mu et al. |
| 2010/0291918 A1 | 11/2010 | Suzuki et al. |
| 2010/0304680 A1 | 12/2010 | Kuffner et al. |
| 2010/0328157 A1 | 12/2010 | Culkin et al. |
| 2011/0002410 A1 | 1/2011 | Forenza et al. |
| 2011/0003610 A1 | 1/2011 | Key et al. |
| 2011/0045764 A1 | 2/2011 | Maruyama et al. |
| 2011/0063181 A1 | 3/2011 | Walker |
| 2011/0069773 A1 | 3/2011 | Doron et al. |
| 2011/0105032 A1 | 5/2011 | Maruhashi et al. |
| 2011/0105167 A1 | 5/2011 | Pan et al. |
| 2011/0136478 A1 | 6/2011 | Trigui |
| 2011/0140954 A1 | 6/2011 | Fortuny-Guasch |
| 2011/0142104 A1 | 6/2011 | Coldrey et al. |
| 2011/0190005 A1 | 8/2011 | Cheon et al. |
| 2011/0194504 A1 | 8/2011 | Gorokhov et al. |
| 2011/0212684 A1 | 9/2011 | Nam et al. |
| 2011/0222616 A1 | 9/2011 | Jiang et al. |
| 2011/0299441 A1 | 12/2011 | Petrovic |
| 2012/0034924 A1 | 2/2012 | Kalhan |
| 2012/0057508 A1 | 3/2012 | Moshfeghi |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0149300 A1 | 6/2012 | Forster |
| 2012/0206299 A1 | 8/2012 | Valdes-Garcia |
| 2012/0230274 A1 | 9/2012 | Xiao et al. |
| 2012/0257516 A1 | 10/2012 | Pazhyannur et al. |
| 2012/0259547 A1 | 10/2012 | Morlock et al. |
| 2012/0314570 A1 | 12/2012 | Forenza et al. |
| 2013/0044028 A1 | 2/2013 | Lea et al. |
| 2013/0057447 A1 | 3/2013 | Pivit et al. |
| 2013/0089123 A1 | 4/2013 | Rahul et al. |
| 2013/0114468 A1 | 5/2013 | Hui et al. |
| 2013/0155891 A1 | 6/2013 | Dinan |
| 2013/0272437 A1 | 10/2013 | Eidson et al. |
| 2014/0003338 A1 | 1/2014 | Rahul et al. |
| 2014/0010319 A1 | 1/2014 | Baik et al. |
| 2014/0035731 A1 | 2/2014 | Chan et al. |
| 2014/0198696 A1 | 7/2014 | Li et al. |
| 2014/0241296 A1 | 8/2014 | Shattil |
| 2015/0011160 A1 | 1/2015 | Jurgovan et al. |
| 2015/0031407 A1 | 1/2015 | Moshfeghi |
| 2015/0042744 A1 | 2/2015 | Ralston et al. |
| 2015/0091706 A1 | 4/2015 | Chemishkian et al. |
| 2015/0123496 A1 | 5/2015 | Leabman et al. |
| 2015/0229133 A1 | 8/2015 | Reynolds et al. |
| 2015/0303950 A1 | 10/2015 | Shattil |
| 2015/0318897 A1 | 11/2015 | Hyde et al. |
| 2015/0341098 A1 | 11/2015 | Angeletti et al. |
| 2016/0014613 A1 | 1/2016 | Ponnampalam et al. |
| 2016/0054440 A1 | 2/2016 | Younis |
| 2016/0094092 A1 | 3/2016 | Davlantes et al. |
| 2016/0094318 A1 | 3/2016 | Shattil |
| 2016/0192400 A1 | 6/2016 | Sohn et al. |
| 2016/0203347 A1 | 7/2016 | Bartholomew et al. |
| 2016/0219567 A1 | 7/2016 | Gil et al. |
| 2016/0285481 A1 | 9/2016 | Cohen |
| 2017/0026218 A1 | 1/2017 | Shattil |
| 2017/0078897 A1 | 3/2017 | Duan et al. |
| 2017/0201437 A1 | 7/2017 | Balakrishnan et al. |
| 2017/0212208 A1 | 7/2017 | Baek et al. |
| 2017/0237290 A1 | 8/2017 | Bakker et al. |
| 2017/0288727 A1 | 10/2017 | Rappaport |
| 2017/0324480 A1 | 11/2017 | Elmirghani et al. |
| 2017/0339625 A1 | 11/2017 | Stapleton |
| 2018/0026586 A1 | 1/2018 | Carbone et al. |

(56) References Cited

U.S. PATENT DOCUMENTS

| | | | |
|---|---|---|---|
| 2018/0041270 A1 | 2/2018 | Buer et al. | |
| 2018/0048390 A1* | 2/2018 | Palmer | H04B 10/116 |
| 2018/0090992 A1 | 3/2018 | Shrivastava et al. | |
| 2018/0115305 A1 | 4/2018 | Islam et al. | |
| 2018/0220416 A1* | 8/2018 | Islam | H04B 7/0639 |
| 2019/0089434 A1 | 3/2019 | Rainish et al. | |
| 2019/0230626 A1 | 7/2019 | Rune et al. | |

OTHER PUBLICATIONS

K. Han and K. Huang, "Wirelessly Powered Backscatter Communication networks: Modeling, Coverage and Capacity," Apr. 9 2016, Arxiv.com.
Non-Final Office Action in U.S. Appl. No. 15/432,091 dated Nov. 22, 2017.
Notice of Allowance in U.S. Appl. No. 15/432,091 dated Apr. 11, 2018.
Notice of Allowance in U.S. Appl. No. 15/835,971 dated Jul. 23, 2018.
Notice of Allowance in U.S. Appl. No. 15/835,971 dated May 29, 2018.
Shimin Gong et al., "Backscatter Relay Communications Powered by Wireless Energy Beamforming," IEEE Trans. on Communication, 2018.
Corrected Notice of Allowance in U.S. Appl. No. 15/607,743 dated Apr. 3, 2019.
Notice of Allowance in U.S. Appl. No. 15/607,743 dated Jan. 22, 2019.
Notice of Allowance in U.S. Appl. No. 15/834,894 dated Feb. 20, 2019.
Notice of Allowance in U.S. Appl. No. 15/904,521 dated Mar. 20, 2019.
Corrected Notice of Allowability for U.S. Appl. No. 15/904,521 dated May 6, 2019.
Corrected Notice of Allowance for U.S. Appl. No. 16/031,007 dated Jul. 8, 2019.
Corrected Notice of Allowance for U.S. Appl. No. 15/607,743 dated May 10, 2019.
Corrected Notice of Allowance for U.S. Appl. No. 15/904,521 dated Jun. 21, 2019.
Corrected Notice of Allowance for U.S. Appl. No. 15/904,521 dated May 10, 2019.
Ex Parte Quayle Action for U.S. Appl. No. 16/032,668 dated Jul. 10, 2019.
Notice of Allowance issued in U.S. Appl. No. 16/129,423 dated Jul. 15, 2019.
USPTO Miscellaneous communication for U.S. Appl. No. 15/834,894 dated Apr. 19, 2019.
Corrected Notice of Allowance for U.S. Appl. No. 16/382,386 dated Dec. 30, 2019.
Corrected Notice of Allowance for U.S. Appl. No. 15/616,911 dated Oct. 31, 2019.
Corrected Notice of Allowance for U.S. Appl. No. 15/616,911 dated Dec. 12, 2019.
Corrected Notice of Allowance for U.S. Appl. No. 16/031,007 dated Oct. 22, 2019.
Corrected Notice of Allowance for U.S. Appl. No. 16/032,617 dated Oct. 28, 2019.
Corrected Notice of Allowance for U.S. Appl. No. 16/032,668 dated Dec. 30, 2019.
Corrected Notice of Allowance for U.S. Appl. No. 16/129,423 dated Nov. 7, 2019.
Final Office Action for U.S. Appl. No. 16/125,757 dated Dec. 2, 2019.
Non-Final Office Action for U.S. Appl. No. 16/388,043 dated Dec. 27, 2019.
Non-Final Office Action in U.S. Appl. No. 15/836,198 dated Oct. 31, 2019.
Notice of Allowance for U.S. Appl. No. 15/595,919 dated Oct. 25, 2019.
Notice of Allowance for U.S. Appl. No. 16/129,423 dated Nov. 27, 2019.
Corrected Notice of Allowance for U.S. Appl. No. 15/616,911 dated Jan. 24, 2020.
Corrected Notice of Allowance for U.S. Appl. No. 15/904,521 dated Jan. 8, 2020.
Corrected Notice of Allowance for U.S. Appl. No. 16/032,617 dated Jan. 9, 2020.
Corrected Notice of Allowance for U.S. Appl. No. 16/129,423 dated Jan. 23, 2020.
Corrected Notice of Allowance for U.S. Appl. No. 16/382,386 dated Feb. 6, 2020.
Final Office Action for U.S. Appl. No. 16/526,544 dated Feb. 12, 2020.
Non-Final Office Action for U.S. Appl. No. 16/129,413 dated Feb. 12, 2020.
Non-Final Office Action for U.S. Appl. No. 16/666,680 dated Feb. 19, 2020.
Notice of Allowance for U.S. Appl. No. 16/294,025 dated Jan. 13, 2020.
Supplemental Notice of Allowance for U.S. Appl. No. 16/032,668 dated Feb. 14, 2020.
Corrected Notice of Allowance for U.S. Appl. No. 15/904,521 dated Mar. 12, 2020.
Corrected Notice of Allowance for U.S. Appl. No. 16/032,668 dated Mar. 23, 2020.
Final Office Action for U.S. Appl. No. 16/377,980 dated Mar. 4, 2020.
Non-Final Office Action for U.S. Appl. No. 16/125,757 dated Mar. 23, 2020.
Non-Final Office Action for U.S. Appl. No. 16/364,956 dated Apr. 10, 2020.
Notice of Allowance for U.S. Appl. No. 16/231,903 dated Mar. 24, 2020.
Notice of Allowance for U.S. Appl. No. 16/526,544 dated Apr. 9, 2020.
Supplemental Notice of Allowance for U.S. Appl. No. 16/129,423 dated Mar. 3, 2020.
Supplemental Notice of Allowance for U.S. Appl. No. 16/294,025 dated Mar. 25, 2020.

* cited by examiner

CONTROLLED POWER TRANSMISSION IN RADIO FREQUENCY (RF) DEVICE NETWORK

CROSS-REFERENCE TO RELATED APPLICATIONS/INCORPORATION BY REFERENCE

This Patent Application is a Continuation Application of U.S. patent application Ser. No. 15/835,971, filed on Dec. 8, 2017.

This Patent Application also makes reference to:
application Ser. No. 15/607,743, which was filed on May 30, 2017;
application Ser. No. 15/834,894, which was filed on Dec. 7, 2017;
application Ser. No. 15/836,198 which was filed on Dec. 8, 2017;
application Ser. No. 15/432,091, which was filed on Feb. 14, 2017, entitled "Outphasing Transmitters with Improved Wireless Transmission Performance and Manufacturability;" and
U.S. Pat. No. 7,848,386.

Each of the above referenced Applications, and Patent is hereby incorporated herein by reference in its entirety.

FIELD OF TECHNOLOGY

Certain embodiments of the disclosure relate to reflector devices in a radio frequency (RF) communication system. More specifically, certain embodiments of the disclosure relate to a method and system for controlled power transmission in RF device network.

BACKGROUND

RF energy, in form of radiating waves, is broadcasted from radio transmitter devices, for example, mobile base stations and television/radio broadcast stations, to a variety of RF receiver devices, via RF communication network. Such RF receiver devices may have the ability harvest such RF energy for power generation and subsequent transmission to battery-based low-power devices associated with the RF receiver devices. A robust and advanced system of an RF device network may be required that is capable of intelligently controlling the power transmission in such RF device network.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for controlled power transmission in RF device network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for controlling power transmission in RF device network. In the following description, reference is made to the accompanying drawings, which form a part hereof, and in which is shown, by way of illustration, various embodiments of the present disclosure.

Figure 1:
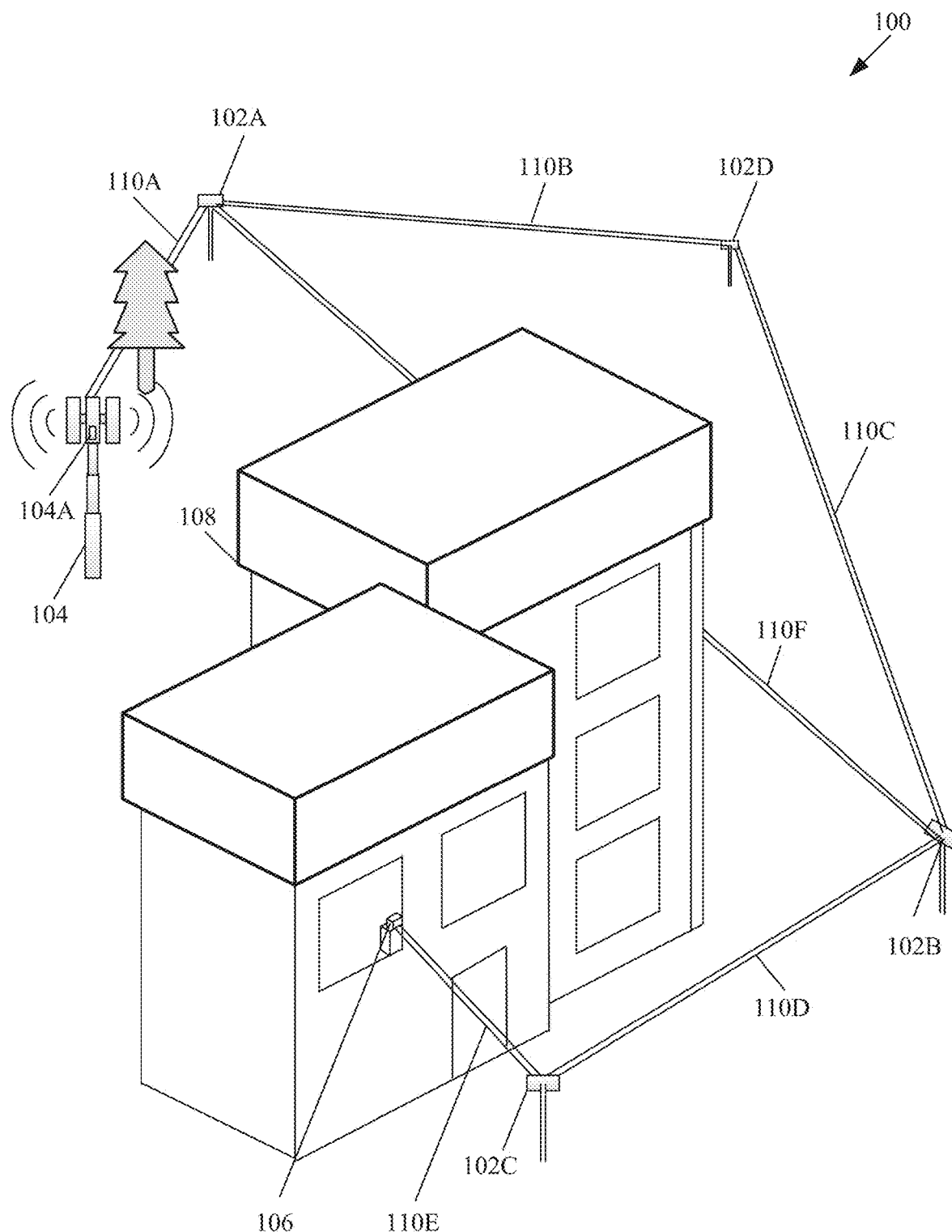
FIG. 1 is an exemplary network environment diagram, in accordance with an exemplary embodiment of the disclosure.

FIG. 1 is an exemplary network environment diagram, in accordance with an exemplary embodiment of the disclosure. With reference to FIG. 1, there is shown a network environment diagram 100 that may correspond to an RF device network. The RF device network may include various RF devices, such as a plurality of reflector devices 102, a base station 104, and a customer premises equipment (CPE) 106. The plurality of reflector devices 102 may include at least a first active reflector device 102A, a second active reflector device 102B, a third active reflector device 102C, and a first passive reflector device 102D. There is further shown a first microcontroller 104A (in the base station 104) and customer premises 108. There is further shown a first radio signal path 110A, a second radio signal path 110B, a third radio signal path 110C, a fourth radio signal path 110D, a fifth radio signal path 110E, and a sixth radio signal path 110F.

Although there is shown only one passive reflector device and three active reflector devices, the disclosure is not so limited. Accordingly, the count of the passive reflector devices and the active reflector devices may vary based on various factors, such as the location of the base station 104, relative distance of the base station 104 from the CPE 106, and count and type of physical obstructing devices, without deviation from the scope of the disclosure. In accordance with an embodiment, one or more circuits of each of the plurality of reflector devices 102 may be integrated in a package of the plurality of antenna modules of the corresponding reflector device. In accordance with an embodiment, the one or more circuits of each of the plurality of reflector devices 102 may be on a printed circuit board on which the plurality of antenna modules of the corresponding reflector device is mounted.

The plurality of reflector devices 102 may include various active and passive reflector devices, such as at least the first active reflector device 102A, the second active reflector device 102B, the third active reflector device 102C, and the first passive reflector device 102D. In accordance with an embodiment, one or more of the plurality of reflector devices 102, such as the first active reflector device 102A, the second active reflector device 102B, and the third active reflector device 102C, may comprise at least an array of distributed transmitters (or an array of distributed transceivers) that may utilize various transmission schemes, such as multiple-input-multiple-output (MIMO) transmission. In an exemplary embodiment of the disclosure, the distributed transmitters (or transceivers) in the plurality of reflector devices 102 may utilize transmit beamforming for the MIMO transmission.

Each of the first active reflector device 102A, the second active reflector device 102B, and the third active reflector device 102C may be a single-beam or a multi-beam active reflector device configured to perform a plurality of operations on a plurality of beams of RF signals received from an RF device. Examples of the RF device may include the base station 104, an access point (not shown), or an RF reflector device, for example, the first passive reflector device 102D or other active reflector devices. Examples of such plurality of operations may include, but are not limited to, adjusting an amplitude gain, adjusting phase shift, performing beamforming to generate a plurality of beams of RF signals, and performing beam steering based on the phase shifting of the plurality of beams of RF signals to deflect the plurality of beams at a desired angle. It may be noted that the first active reflector device 102A, the second active reflector device 102B, and the third active reflector device 102C may require a substantial DC power for performing the above-mentioned operations.

The first active reflector device 102A, the second active reflector device 102B, and the third active reflector device 102C may be positioned in vicinity of physical obstructing objects, such as a tree or a tinted glass window, which may partially block or impair the path of the plurality of beams of RF signals. Each of the first active reflector device 102A, the second active reflector device 102B, and the third active reflector device 102C may be realized based on other components, such as a plurality of low-noise amplifiers, a plurality of phase shifters, a combiner, a splitter, a plurality of power amplifiers, and mixers.

Each of the first active reflector device 102A, the second active reflector device 102B, and the third active reflector device 102C may comprise a first antenna array, i.e. a transmitter array, and a second antenna array, i.e. a receiver array. In accordance with an embodiment, the first antenna array may be configured to transmit a set of beams of RF signals to one or more RF devices, for example, the base station 104, the CPE 106, and other active or passive reflector devices in the RF device network. Likewise, in accordance with another embodiment, the second antenna array may be configured to receive another set of beams of RF signals from the RF devices.

In accordance with the embodiment, one of the active or passive reflector devices, such as the second active reflector device 102B, from dynamically selected plurality of reflector devices 102 by an RF device, for example, the base station 104 in the RF device network may be configured to convert RF energy associated with the received set of beams of RF signals into continuous and stable DC voltage or power signal. In accordance with an embodiment, such DC voltage or power signal may be regulated and transmitted to one or more electronic devices associated with the second active reflector device 102B, based on one or more device characteristics of the one or more electronic devices. In accordance with another embodiment, such DC voltage or power signal may be regulated and utilized to power and charge internal circuits of the second active reflector device 102B. The structure and functionality of the second active reflector device 102B, which generates and subsequently transmits voltage or power to the one or more electronic devices, has been described in FIG. 2.

The first passive reflector device 102D may be configured to provide only a deflection to the plurality of beams of RF signals without adjusting the amplitude gain and the phase shift of the plurality of beams of RF signals. The first passive reflector device 102D may provide the deflection based on various parameters, such as an incident angle, scan angle, and sizes of the first passive reflector device 102D. The first passive reflector device 102D may be positioned in a vicinity of a physical obstructing object, such as a building, that may completely block the path of the plurality of beams of RF signals. The first passive reflector device 102D may be realized by a simple metal plane with a flat or a curved surface. The first passive reflector device 102D may be arranged at an incident angle, so that the angle of incoming plurality of beams of RF signals corresponds to the angle of the outgoing plurality of beams of RF signals.

The base station 104 is a fixed point of communication that may communicate information, in the form of the plurality of beams of RF signals, to and from a transmitting/receiving device, such as the CPE 106, via the dynamically selected plurality of reflector devices 102. Multiple base stations, corresponding to one or more service providers, may be geographically positioned to cover specific geographical areas. Typically, bandwidth requirements serve as a guideline for a location of the base station 104 based on relative distance between the CPE 106 and the base station 104. The count of base stations depends, for example, on expected usage, which may be a function of population density, and geographic irregularities, such as buildings and mountain ranges, which may interfere with the plurality of beams of RF signals.

The base station 104 may comprise one or more circuits, such as the first microcontroller 104A, that may be configured to dynamically select the plurality of reflector devices 102, such as the first active reflector device 102A, the second active reflector device 102B, the third active reflector device 102C, and the first passive reflector device 102D, along a non-line-of-sight (NLOS) radio path based on a first set of criteria, described below. Such a combination of the various dynamically selected plurality of reflector devices 102, may form a multi-beam antenna array network.

The base station 104, in conjunction with a global positioning system (GPS) may be further configured to determine the location of the plurality of reflector devices 102. Apart from the GPS, various other techniques, for example, radio frequency identification (RFID) system, global navigation satellite system (GNSS), site map, signal delay, database information, and the like may also be deployed to determine the location of the plurality of reflector devices 102.

The first microcontroller 104A in the base station 104 may be further configured to determine an optimized NLOS radio path out of the available NLOS radio paths for the transmission of the plurality of beams of RF signals to various RF devices in the RF device network. For example, the first microcontroller 104A may determine an optimized NLOS radio path that corresponds to a combination of, for example, the first radio signal path 110A, the sixth radio signal path 110F, the fourth radio signal path 110D, and the fifth radio signal path 110E, for transmission of RF signals from the base station 104 to the CPE 106. In another example, the optimized NLOS radio path may correspond to a combination of, for example, the first radio signal path 110A, the second radio signal path 110B, and the third radio signal path 110C, for transmission of RF signals from the base station 104 to the second active reflector device 102B.

The first microcontroller 104A in the base station 104 may be configured to receive a power requirement request and other associated metadata, hereinafter interchangeably referred to as a second set of criteria, from an RF device, such as the second active reflector device 102B. In accordance with an embodiment, the second set of criteria may be associated with the electronic device associated with the second active reflector device 102B. In accordance with another embodiment, the second set of criteria may be associated with the second active reflector device 102B.

Accordingly, the first microcontroller 104A may be configured to control the dynamically selected plurality of reflector devices 102 based on the second set of criteria. The second set of criteria may correspond to the power requirement request received from the electronic device or the RF device, type and make of the electronic device or the RF device, unique identification of the electronic device or the RF device, profile of the electronic device or the RF device, priority level of the electronic device or the RF device, and other context relevant entities.

In accordance with an embodiment, the first microcontroller 104A in the base station 104 may enable the base station 104 to dynamically configure and manage operation of the entire distributed transceivers in each RF device in the RF device network. In such a case, the base station 104 may be referred to a master RF device. Such master RF device may be utilized to configure, control, and manage the entire distributed transceivers in the RF device network to optimize overall network performance and power management.

Figure 2:
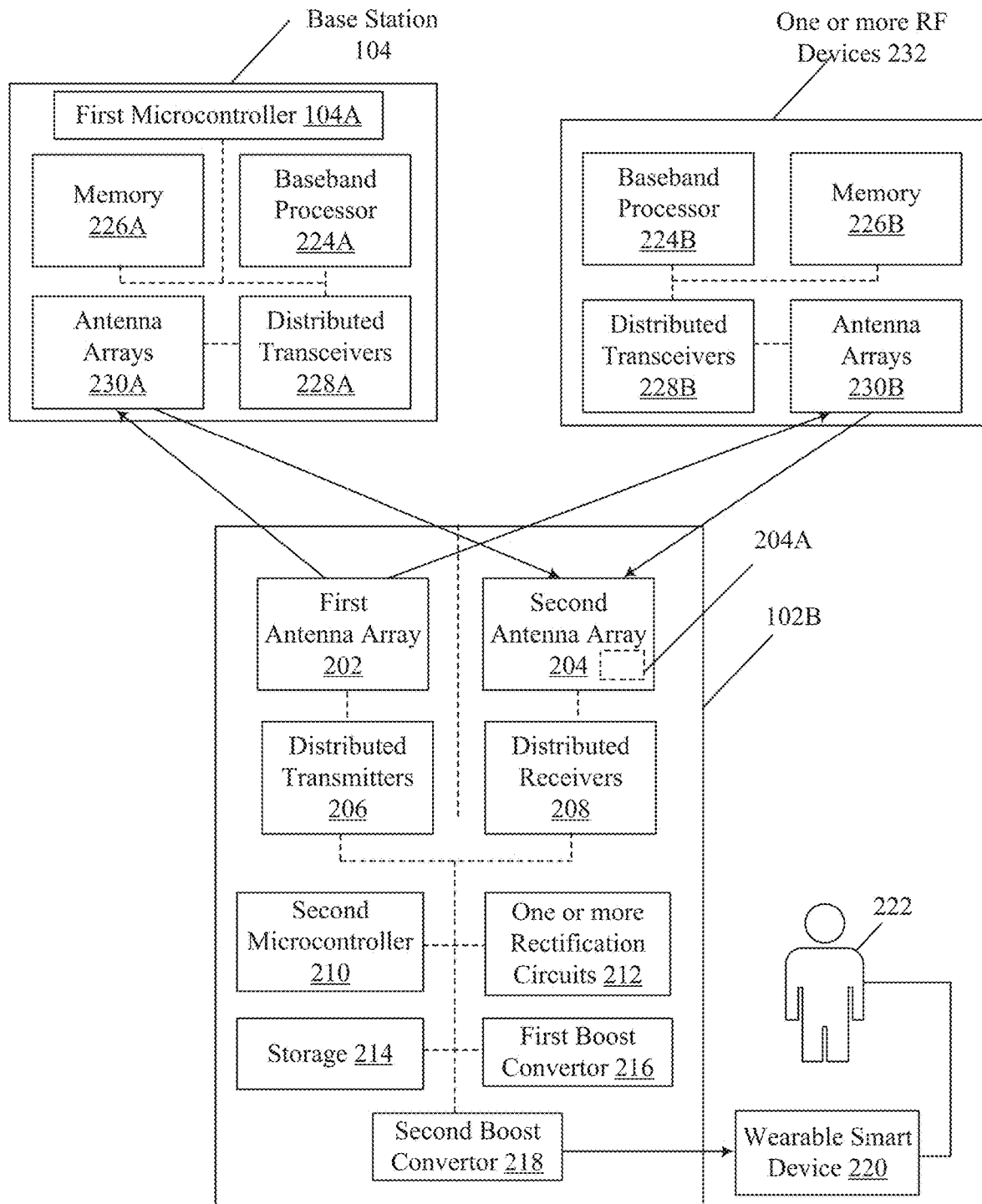
FIG. 2 illustrates a block diagram of an exemplary RF receiver device, in accordance with an exemplary embodiment of the disclosure.

The first microcontroller 104A may be further configured to monitor and collect RF communication environment information, such as propagation environment conditions, link quality, application device capabilities, antenna polarization, radiation pattern, antenna spacing, array geometry, transmitter/receiver locations, target throughput, and/or application QoS requirements. The first microcontroller 104A may utilize the collected RF communication environment information to configure system, network and communication environment conditions as desired. For example, the first microcontroller 104A may perform high level system configurations, such as the number of transceivers that are activated, the number of application devices in communication, and adding/dropping application devices to the RF communication network. As shown in FIGS. 1 and 2, the first microcontroller 104A is residing in the base station 104. However, in some embodiments, the first microcontroller 104A may reside in different RF devices, such as separate network microprocessors and servers on the RF communication network. In accordance with an embodiment, the functionality of the first microcontroller 104A may be distributed over several devices in the RF communication network. The first microcontroller 104A may be further configured to manage communication sessions over the RF communication network. In this regard, the first microcontroller 104A may coordinate operation of baseband processors in the RF communication network such that various baseband processing may be split or shared among the baseband processors.

The CPE 106 may correspond to a telecommunication hardware located inside the customer premises 108, such as an office facility or a home space. Examples of the CPE 106 may include, but are not limited to, a home router, a cable or satellite television set-top box, a VoIP base station, or other customized hardware. In accordance with an embodiment, the CPE 106 may be a single receiving device that may receive the plurality of beams of RF signals, concurrently transmitted by the master RF device, i.e. the base station 104, in a same RF band over the entire distributed transceivers in the RF device network.

A plurality of radio signal paths, such as the first radio signal path 110A, the second radio signal path 110B, the third radio signal path 110C, the fourth radio signal path 110D, the fifth radio signal path 110E, and the sixth radio signal path 110F may correspond to various paths of propagation of a beam of RF signals that is otherwise obscured (partially or completely) by physical objects. Such obstructing physical objects make it difficult for the RF signal to pass through in a wireless communication network in a line-of-sight (LOS), thus is the reason for selection of an NLOS path. Common physical objects between an RF transmitter device and an RF receiver device may include, for example, tall buildings, tinted glass, doors, walls, trees, physical landscape, and high-voltage power conductors. The plurality of radio signal paths may be facilitated by various wireless communication standards, such as, but not limited to, IEEE 802.11n (Wi-Fi), IEEE 802.11ac (Wi-Fi), HSPA+ (3G), WiMAX (4G), and Long Term Evolution (4G), 5G, power-line communication for 3-wire installations as part of ITU G.hn standard, and HomePlug AV2 specification. In accordance with an embodiment, the wireless communication network may facilitate extremely high frequency (EHF), which is the band of radio frequencies in the electromagnetic spectrum from 30 to 300 gigahertz. Such radio frequencies have wavelengths from ten to one millimeter, referred to as millimeter wave (mmWave).

In operation, a first RF device, as the master RF device, may be configured to transmit a plurality of beams of RF signals to various RF devices in the RF network. Examples of the first RF device may include, the base station 104, the CPE 106, and the plurality of reflector devices 102. In an exemplary embodiment as per FIG. 1, the base station 104 and the CPE 106 are not in the LOS radio path. Thus, the base station 104 may be required to determine an optimized NLOS radio path out of the available NLOS radio paths for the transmission of the plurality of beams of RF signals to the CPE 106.

Specifically, for such RF transmission to the CPE 106, the base station 104 may be configured to locate the plurality of reflector devices 102. The base station 104 may be configured to locate the plurality of reflector devices 102 based on various methods, systems, or techniques, known in the art. According to one of such systems, for example, a radio frequency identification (RFID) system, RFID tags may each be associated with each RF device in the RF device network for a various operations, for example, tracking inventory, tracking status, location determination, assembly progress, and the like. The RF device network may include one or more RFID readers. Each RFID reader may wirelessly communicate with one or more RFID tags within corresponding coverage area. The RFID readers may collect data, for example, location data as may be requested from the base station 104 from each of the RFID tags within corresponding coverage area. The collected data may be communicated to the base station 104 via wired or wireless connection and/or via peer-to-peer communication.

The base station 104 may be further configured to dynamically select the plurality of reflector devices 102, such as the first active reflector device 102A, the second active reflector device 102B, the third active reflector device 102C, and the first passive reflector device 102D, along a non-line-of-sight (NLOS) radio path based on a first set of criteria. Such a combination of the various dynamically selected plurality of reflector devices 102, may form a multi-beam antenna array network. The first set of criteria for the dynamic selection of the plurality of reflector devices 102 corresponds to a location of the plurality of reflector devices 102, a relative distance of the plurality of reflector devices 102 with respect to the RF transmitter device, a type of one or more physical obstructing objects, and one or more parameters measured at the plurality of reflector devices 102. The one or more parameters may correspond to at least an antenna gain, a signal-to-noise ratio (SNR), a signal-to-interference-plus-noise ratio (SINR), a carrier-to-noise (CNR), and a carrier-to-interference-and-noise ratio (CINR) of the plurality of reflector devices 102.

The first microcontroller 104A in the base station 104 may be configured to dynamically select, configure, and manage operations of the entire distributed transceivers (corresponding to the base station 104, the CPE 106, and the plurality of reflector devices 102. Accordingly, the first microcontroller 104A may determine an optimized NLOS path for such RF transmission. The optimized NLOS radio path may correspond to optimum characteristics for example, shortest radio path, optimum signals level, maximum bitrate, increased access speed, highest throughput, and the like, between, for example, the base station 104 and the CPE 106. The optimized NLOS radio path may further correspond to a guaranteed transmission of the plurality of beams of RF signals to the CPE 106.

Once the optimal NLOS radio path is determined, the array of distributed transmitters (or an array of distributed transceivers), which corresponds to various RF devices over the optimal NLOS radio path, utilize various transmission schemes, such as MIMO transmission, for RF communication. Accordingly, the plurality of beams of RF signals are transmitted from the base station 104 to the CPE 106, via the plurality of reflector devices 102 in the most optimal manner exhibiting high network performance, maximum network coverage, and further generation and transmission of power by RF device to associated electronic devices, as described in detail in FIGS. 1 and 2.

It may be noted the selection of the plurality of reflector devices 102 and the determination of the NLOS radio path, in the above exemplary scenario may be based on the shortest distance, presence of interference sources, and type of obstructing physical object. However, it should not be construed to be limiting the scope of the disclosure. Notwithstanding, the selection of the plurality of reflector devices 102, and the determination of the NLOS radio path may be further based on other parameters, without deviation from the scope of the disclosure.

In accordance with an embodiment, a second RF device of the RF devices may receive a power requirement request from an associated electronic device of the one or more electronic devices. In accordance with another embodiment, the second RF device of the RF devices may generate the power requirement request in case the RF device is low on DC power or may be out of coverage area. The power requirement request may be in form of a real-time continuous or discrete data stream and/or channel, non-real-time data, device sensor data, user-device interaction dataset, user reporting dataset, or any combination including metadata thereof. For example, the data may include current power measurements, user commands, or user-reported status updates.

Various examples of the one or more electronic devices may include battery-enabled low-power Internet of Things (IoT) devices. The IoT devices may correspond to non-standard computing devices connected wirelessly to a reflector device of the plurality of reflector devices 102 via one or more smart networks. Examples of the IoT devices may include smart phones, smart watches, smart sensors (e.g., mechanical, thermal, electrical, magnetic, etc.), networked appliances, networked peripheral devices, networked lighting system, communication devices, networked vehicle accessories, smart accessories, tablets, smart TV, computers, smart security system, smart home system, other devices for monitoring or interacting with or for people and/or places, or any combination thereof. Apart from the IoT devices, other examples may include wearable medical sensors, mobile devices, real time locating system (RTLS) tracking tags, and various consumer electronic (CE) devices, such as e-book readers, and the like.

The second RF device may be one of the base station 104, the CPE 106, or the plurality of reflector devices 102. For exemplary purpose, it is assumed that the second active reflector device 102B is the second RF device. In accordance with an embodiment, the second RF device may be embedded within the electronic device. In accordance with another embodiment, the RF device may be external to the electronic device. The electronic device may be associated with the second RF device via different channels of wireless communication and may include local networks therein. Examples of the wireless communication may correspond to cellular networks, IEEE 802.15.4, WiFi, BlueTooth, 6Low-Pan, Zigbee, near-field communication (NFC), Z-wave or any combination thereof.

In accordance with an embodiment, the second RF device may be configured to identify the electronic device based on one or more of a unique IoT device identifier, a protocol based identifier, a device and protocol based identifier, and a device behavior based identifier. The second RF device may be configured to identify the electronic device based on image recognition, geo-location determined through RF beacons of other devices around, and the like. Accordingly, the second RF device may transmit the power requirement request and other associated metadata, received from the electronic device, to the first microcontroller 104A of the base station 104.

In accordance with another embodiment, the second RF device may be configured to transmit the self-generated power requirement request and other metadata to the first microcontroller 104A of the base station 104.

The first microcontroller 104A may receive the power requirement request and other associated metadata (or the second set of criteria), from the second RF device. Accordingly, the first microcontroller 104A may be configured to control the remaining reflector devices of the dynamically selected plurality of reflector devices 102 based on the second set of criteria, when one of the dynamically selected plurality of reflector devices 102 generates a power requirement request. As described above, the second set of criteria may correspond to the power requirement request received from the electronic device or the RF device, type and make of the electronic device or the RF device, unique identification of the electronic device or the RF device, profile of the electronic device or the RF device, priority level of the electronic device or the RF device, and other context relevant entities.

The remaining active reflector devices of the controlled plurality of reflector devices 102 may be configured to perform beamforming based on the second set of criteria, and transmit a plurality of beams of RF signals to the second RF device, which is low on power, out of coverage area, or is associated with the electronic device low on power. For example, the first active reflector device 102A and the third active reflector device 102C, of the plurality of reflector devices 102 may perform beamforming to transmit the plurality of beams of RF signals to the second active reflector device 102B. Further, the first passive reflector device 102D, of the plurality of reflector devices 102 may deflect incoming beams of RF signals to the second active reflector device 102B.

The second RF device may be configured to receive the plurality of beams of RF signals, via the corresponding second antenna array. The second antenna array of the second RF device may be further configured to generate alternating current (AC) voltage or power signal based on the RF energy associated with the received plurality of beams of RF signals. The second RF device may be further configured to convert the AC voltage or power signal into DC voltage or power signal. The varying voltage or power signal may be stabilized and regulated. In accordance with an embodiment, the stabilized and regulated DC voltage or power signal may be regulated and transmitted to the electronic device by the second RF device based on one or more device characteristics, for example, impedance, current power level, threshold power level, priority level, and power requirements of the electronic device. In accordance with another embodiment, the stabilized and regulated DC voltage or power signal may be utilized by the internal circuits or battery of the second RF device based on one or more device characteristics, for example, impedance, current power level, threshold power level, priority level, and power requirements of the second RF device. Detailed description of power generation and transmission has been described in detail in FIG. 2.

FIG. 2 illustrates a block diagram of an exemplary RF device, in accordance with an exemplary embodiment of the disclosure. With reference to FIG. 2, there is shown second active reflector device 102B as the exemplary RF device that generates and transmits power to associated electronic devices, in accordance with an exemplary embodiment of the disclosure.

With reference to FIG. 2, the second active reflector device 102B may correspond to a single-beam or a multi-beam active reflector device and may include a first antenna array 202, a second antenna array 204, a plurality of antenna elements 204A, a second microcontroller 210, and one or more rectifier circuits 212. The second active reflector device 102B may further include, a storage 214, a first boost convertor 216, a second boost converter 218, a wearable smart device 220, and a user 222. The second microcontroller 210 may be configured to control the operations of other electronic components, such as the plurality of antenna elements 204A, one or more rectifier circuits 212, the first boost convertor 216 and the second boost converter 218, based on power requirement, device characteristics, and other metadata associated with the wearable smart device 220. The wearable smart device 220 may be an IoT device, associated with the second active reflector device 102B, via one of the wireless communication channels, as described in FIG. 1.

The base station 104 and one or more RF devices 232 may comprise different instances of various components, such as a baseband processor 224, a memory 226, a plurality of distributed transceivers 228, and antenna arrays 230. More specifically, the base station 104 comprises a first instance, such as a baseband processor 224A, a memory 226A, a plurality of distributed transceivers 228A, and antenna arrays 230A, of such components. Similarly, the one or more RF devices 232 comprise a second instance, such as a baseband processor 224B, a memory 226B, a plurality of distributed transceivers 228B, and antenna arrays 230B, of such components.

In accordance with an embodiment, the second antenna array 204 at a receiver chip in the second active reflector device 102B may be configured to receive a plurality of beams of RF signals from one or more RF devices 232 in the RF network. The one or more RF devices 232 may include the plurality of reflector devices 102, and other RF devices, such as the CPE 106, in the RF network. In accordance with an embodiment, the count of beams of RF signals received by the (multi-beam) second active reflector device 102B may be based on the size of the first antenna array 202 and the second antenna array 306, number of antenna modules at the transmitter and the receiver chips, and the hardware configuration of the second active reflector device 102B. The first antenna array 202 and the second antenna array 204 of the second active reflector device 102B may be programmable and may be dynamically controlled by the base station 104, a central device server, one of the plurality of reflector devices 102, or a mobile device. In accordance with an embodiment, the transmission of the plurality of beams of RF signals to at least the RF transmitter device and the RF receiver device (by the first antenna array 202), via distributed transmitters, such as the distributed transmitters 206 communicatively coupled with the first antenna array 202, may be in accordance with MIMO transmission. Further, the reception of the plurality of beams of RF signals from at least the RF transmitter device and the RF receiver device (by the second antenna array 204), via distributed receivers, such as the distributed receivers 208 communicatively coupled with the second antenna array 204, may be in accordance with MIMO reception.

The baseband processor 224 may comprise suitable logic, circuitry, interfaces and/or code that may be configured to perform baseband digital signal processing required for transmission and receiving operation of the plurality of distributed transceivers 228. In accordance with an embodiment, the baseband processor 224 may generate a plurality of MIMO coded data streams at baseband, to be transmitted to other RF devices. In accordance with another embodiment, the baseband processor 224 may receive the plurality of MIMO coded data streams at baseband, transmitted by other RF devices. The baseband processor 224 may be configured to perform various processes, such as waveform generation, equalization, and/or packet processing, associated with the operation of the plurality of distributed transceivers 228. Further, the baseband processor 224 may be configured to configure, manage and control orientations of the plurality of distributed transceivers 228.

The memory 226 may comprise suitable logic, circuitry, interfaces and/or code that may be configured to store information, such as executable instructions and data, which may be utilized by the baseband processor 224 and/or other associated components. The memory 226 may comprise random access memory (RAM), read only memory (ROM), low latency nonvolatile memory, such as flash memory and/or other such electronic data storage.

The distributed transceivers 228 may comprise suitable logic, circuitry, interfaces and/or code that may be configured to enable an RF transmitter device, such as the base station 104, to concurrently communicate each of MIMO coded data streams in same RF band to/from the RF receiver device, such as the CPE 106, through associated antenna arrays 230. Each distributed transceiver may be equipped with an independently configurable antenna or an antenna array configured to transmit and receive RF signals over the air, via the NLOS radio path.

In accordance with an embodiment, the distributed transceivers 228 may be implemented in various ways, such as a single distributed transceiver integrated in a single chip package, multiple silicon dies on one single chip, and multiple distributed transceivers on a single silicon die. Based on device capabilities and user preferences, the distributed transceivers 228 may be oriented in a fixed direction or different directions. In accordance with another embodiment, the distributed transceivers 228 may be configured to receive and/or transmit the plurality of beams of RF signals from and/or to the CPE 106 using air interface protocols specified in Universal Mobile Telecommunications Service (UMTS), Global System for Mobile Communications (GSM), Long-Term Evolution (LTE), wireless local area network (WLAN), 60 GHz/mmWave, and/or Worldwide Interoperability for Microwave Access (WiMAX).

The antenna arrays 230 may comprise suitable logic, circuitry, interfaces and/or code that may be configured to transmit/receive the plurality of beams of RF signals over the air, via the NLOS radio path, under the control of the distributed transceivers 228 and the baseband processor 224. Antennas of each of the antenna arrays 230 may be arranged at different directions or orientations based on antenna types, user preferences, and/or corresponding communication environment information.

Once the optimal NLOS radio path is determined, the distributed transceivers 228, which correspond to various RF devices over the optimal NLOS radio path, utilize various transmission schemes, such as MIMO transmission, for RF communication. Accordingly, the plurality of beams of RF signals are transmitted from the base station 104 to the one or more RF devices 232, via the second active reflector device 102B, in the most optimal manner exhibiting high network performance and maximum network coverage.

During the MIMO transmission, the baseband processor 224A may encode the data streams in the baseband based on various coding algorithms, such as space-time coding or space-time-frequency coding. The coded data streams in the baseband may be initially converted into different corresponding intermediate frequency (IF) bands and then may be further up-converted to the same RF band. The baseband processor 224A may be configured to enable transmit beamforming for the MIMO transmission. Accordingly, each of the coded data stream in the same RF band, as the plurality of beams of RF signals, may be concurrently transmitted, via the antenna arrays 230A, at different directions or orientations over the distributed transceivers 228A of the base station 104 to the one or more RF devices 232, via the second active reflector device 102B over the determined NLOS.

In accordance with an embodiment, the baseband processor 224A, in conjunction with the first microcontroller 104A, may continuously monitor and collect corresponding communication environment information, such as propagation environment conditions, link quality, device capabilities, locations, usage of resources, resource availability, usage of resources, resource availability, target throughput, and/or application QoS requirements reported from the one or more RF devices 232. The first microcontroller 104A may be configured to control the dynamically selected one or more reflector devices based on a feedback channel (not shown) that may be utilized to exchange and negotiate system configurations, such as number of transceivers within RF devices, number of antennas per transceivers, antenna beamformers, channel responses, sequence of antenna array coefficients being evaluated, and/or locations of at least the one or more reflector devices. The antenna arrays 230B in the one or more RF devices 232 may receive the plurality of beams of RF signals. The distributed transceivers 228B may communicate the received plurality of beams of RF signals, after down-conversion, to the baseband processor 224B.

In accordance with an embodiment, each of the programmable first antenna array 202 and the second antenna array 204 in the second active reflector device 102B may include at least a fixed antenna element, a programmable antenna element, and a control module. The programmable antenna element may be coupled to the fixed antenna element and may be tunable to a particular resonant frequency in response to one or more antenna control signals. Accordingly, each of the programmable first antenna array 202 and the second antenna array 204 in the second active reflector device 102B may be dynamically tuned to a particular carrier frequency or sequence of carrier frequencies of a transmitted RF signal and/or of a received RF signal. In accordance with an embodiment, the fixed antenna element may have a resonant frequency or center frequency of operation that is dependent upon physical dimensions of the fixed antenna element, such as a length of a one-quarter wavelength antenna element or other dimension. Programmable antenna element may modify the "effective" length or dimension of the overall antenna by selectively adding or subtracting from the reactance of the programmable antenna element to conform to changes in the selected frequency and the corresponding changes in wavelength. The fixed antenna element may include one or more elements, for example a dipole, loop, annular slot or other slot configuration, rectangular aperture, circular aperture, line source, helical element or other element or antenna configuration. The programmable antenna element may be implemented with an adjustable impedance that may be programmed to any one of a plurality of values. The control module may generate one or more antenna control signals in response to a frequency selection signal. In accordance with an embodiment, the control module may generate the one or more antenna control signals to command the programmable antenna element to modify its impedance in accordance with a desired resonant frequency or a particular carrier frequency that may be indicated by the frequency selection signal. In an exemplary implementation, the carrier frequency is known in advance and the control module may be preprogrammed with specific antenna control signals that correspond to each carrier frequency. In another exemplary implementation, the control module may dynamically calculate a specific impedance and generate antenna control commands to implement the impedance. Such dynamic calculations may be based on equations derived from impedance network principles, known in the art.

The first antenna array 202 and the second antenna array 204 of the second active reflector device 102B may be dynamically controlled in accordance with various configurations. In accordance with an exemplary configuration, when a frequency selection signal is received at the second antenna array 204 from an RF device, such as the base station 104, antenna control signal may be generated at the second antenna array 204. The antenna control signal may tune the corresponding programmable antenna elements to the selected frequency of a sequence of selected carrier frequencies, based on the received frequency selection signal, to transmit the RF signal. Further, a matching network control signal is generated in the second antenna array 204, based on the received frequency selection signal, to provide a substantially constant load impedance for the second antenna array 204 that includes the programmable antenna elements.

In accordance with an embodiment, signal strength of a beam of RF signal received by the second antenna array 204 at the second active reflector device 102B is typically lesser than signal strength of a beam of RF signals transmitted by the first antenna array 202. As such, the received beam of RF signals at the second antenna array 204 may be susceptible to interference from the transmitted beam of RF signals by the first antenna array 202. Therefore, to mitigate or limit the interference, isolation is provided between the transmitter and the receiver chip in the second active reflector device 102B. In accordance with an exemplary implementation for such isolation, the first antenna array 202 and the second antenna array 204 may include antenna elements that may be dual-polarized, such as vertically polarized and horizontally polarized. The dual-polarized antenna elements may be, for example, a patch antenna, a dipole antenna, or a slot antenna. It may be noted that the dual polarization of antenna elements is limited to precisely and mathematically vertical or horizontal. Notwithstanding, without deviation from the scope of the disclosure, dual polarization may refer to any two polarizations of an antenna, for example, substantially or approximately ±45 degrees. In other implementations, the antenna polarizations may be non-orthogonal. Accordingly, the first antenna array 202 and the second antenna array 204 may be implemented sufficiently apart from each other and provided respective RF shields to minimize inter-modulation or mutual interferences.

In accordance with an embodiment, the wearable smart device 220 may detect power requirement and accordingly, initiate a power requirement request at a time instant "t1." The power requirement request may be in form of a real-time continuous or discrete data stream, non-real-time data, device sensor data, user-device interaction dataset, user reporting dataset, or any combination thereof including metadata thereof.

The second microcontroller 210 of the second active reflector device 102B may be configured to identify the wearable smart device 220 based on one or more of a unique IoT device identifier, a protocol based identifier, a device and protocol based identifier, and a device behavior based identifier. The second microcontroller 210 of the second active reflector device 102B may be further configured to identify the wearable smart device 220 based on image recognition, geo-location determined through RF beacons of other devices around, and the like.

The second microcontroller 210 of the second active reflector device 102B may transmit the power requirement request and other associated metadata to the first microcontroller 104A of the base station 104. The first microcontroller 104A may receive the power requirement request and other associated metadata (or the second set of criteria). Accordingly, the first microcontroller 104A may be configured to control the remaining reflector devices of the dynamically selected plurality of reflector devices 102 based on the second set of criteria. The remaining reflector devices of the controlled plurality of reflector devices 102 may transmit a plurality of beams of RF signals to the second active reflector device 102B. For example, the active reflector devices, such as the first active reflector device 102A may perform beamforming to transmit the plurality of beams of RF signals to the second active reflector device 102B, via the sixth radio signal path 110F. Further, the third active reflector device 102C may also perform beamforming to transmit the plurality of beams of RF signals to the second active reflector device 102B, via the fourth radio signal path 110D. Further, the first passive reflector device 102D may deflect a plurality of beams of RF signals to the second active reflector device 102B, via the third radio signal path 110C. The plurality of beams of RF signals may be controlled at respective reflector devices through amplitude and phase adjustments to form constructive interference patterns at the second active reflector device 102B.

The plurality of antenna elements 204A in the second antenna array 204 of the second active reflector device 102B may be configured to receive the plurality of beams of RF signals from the remaining reflector devices of the controlled plurality of reflector devices 102. The plurality of antenna elements 204A may be further configured to generate AC voltage or power signals based on the RF energy associated with the received plurality of beams of RF signals. The amplitude of the AC voltage or power signals may be based on characteristics and configuration of the transmitting RF devices, i.e. the first active reflector device 102A, the third active reflector device 102C, and the first passive reflector device 102D, and various environmental factors that may influence the propagation of the plurality of beams of RF signals in the RF device network.

The one or more rectifier circuits 212 communicatively coupled with the plurality of antenna elements 204A in the second active reflector device 102B may be configured to rectify the AC voltage or power signals generated by the plurality of antenna elements 204A to DC voltage or power signals. The one or more rectifier circuits 212 may include a plurality of electronic components, such as diodes, resistors, inductors, and/or capacitors, configured for the voltage or power rectification. In ideal scenarios, the one or more rectifier circuits 212 may be configured to perform lossless voltage or power conversion in synchronous mode. However, in real-time, such DC voltage or power signals are variable, non-continuous, and unstabilized.

The first boost convertor 216, such as a step-up DC-to-DC converter, may be configured to step-up the output of the one or more rectifier circuits 212, i.e. the DC voltage or power signals, into increased DC voltage or power signals. The output of the first boost convertor 216, i.e. the stepped-up DC voltage or power, may vary and reduced to zero or near zero values at one or more instants. Thus, the output of the first boost convertor 216 is buffered in the storage 214 and provided to a second boost converter 218.

The second boost converter 218 may be configured to stabilize the stepped-up DC voltage or power signals. The second microcontroller 210 may regulate the DC voltage or power signals according to the device characteristics and contractual agreements undertaken by the user 222 of the wearable smart device 220. In accordance with an embodiment, the second microcontroller 210, in conjunction with the second boost converter 218, may transmit the regulated, stabilized and continuous DC voltage or power signals to the battery or internal circuitry of wearable smart device 220. The wearable smart device 220 may utilize the received voltage or power for powering or charging the battery or the internal circuitry. In accordance with another embodiment, the second microcontroller 210 may utilize the regulated, stabilized and continuous DC voltage or power signals to the power the internal battery or internal circuitry of the second active reflector device 102B.

Figure 3:
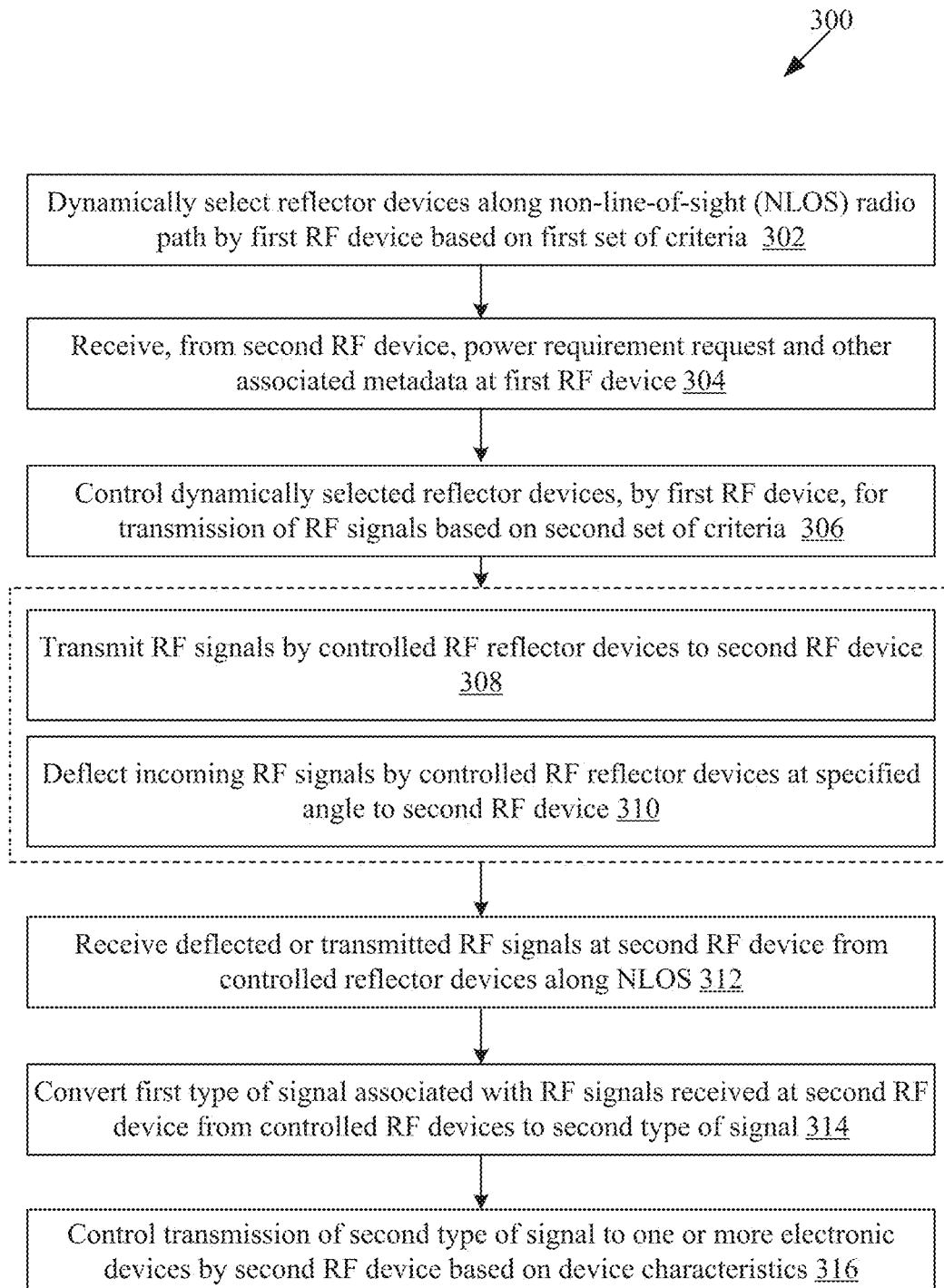
FIG. 3 depicts a flow chart illustrating exemplary operations of an exemplary system for controlling power transmission in RF device network, in accordance with an exemplary embodiment of the disclosure.

FIG. 3 depicts a flow chart illustrating exemplary operations of an exemplary system for controlling power transmission in RF device network, in accordance with an exemplary embodiment of the disclosure. The exemplary operations in FIG. 3 are explained in conjunction with FIGS.

1 and 2. Referring to FIG. 3, there is shown a flow chart 300 comprising exemplary operations 302 through 316.

At 302, plurality of reflector devices 102 may be dynamically selected along NLOS radio path by the first RF device based on the first set of criteria. In accordance with an embodiment, the one or more circuits, such as the first microcontroller 104A, in the base station 104 may be configured to locate and dynamically select plurality of reflector devices 102, such as the first active reflector device 102A, the second active reflector device 102B, the third active reflector device 102C, and the first passive reflector device 102D, along an NLOS radio path based on the first set of criteria. The first set of criteria for the dynamic selection of the plurality of reflector devices 102 may correspond to a location of the plurality of reflector devices 102, a relative distance of the plurality of reflector devices 102 with respect to the RF transmitter device, a type of one or more physical obstructing objects, and one or more parameters measured at the plurality of reflector devices 102. The one or more parameters may correspond to at least an antenna gain, a signal-to-noise ratio (SNR), a signal-to-interference-plus-noise ratio (SINR), a carrier-to-noise (CNR), and a carrier-to-interference-and-noise ratio (CINR) of the plurality of reflector devices 102.

At 304, a power requirement request and other associated metadata, as the second set of criteria, may be received from the second RF device by the first RF device. In accordance with an embodiment, the first microcontroller 104A of the base station 104 may be configured to receive the power requirement request and other associated metadata from one of the dynamically selected plurality of reflector devices 102, i.e. the second active reflector device 102B. In accordance with an embodiment, the second active reflector device 102B may receive the power requirement request from an associated electronic device, such as the wearable smart device 220. The second active reflector device 102B may be configured to identify the electronic device based on one or more of a unique IoT device identifier, a protocol based identifier, a device and protocol based identifier, and a device behavior based identifier. The second active reflector device 102B may be configured to identify the electronic device based on image recognition, geo-location determined through RF beacons of other devices around, and the like. In accordance with another embodiment, the second active reflector device 102B may generate the power requirement request as the internal battery or circuitry may below on power or the second active reflector device 102B is out of coverage area.

At 306, the remaining of the dynamically selected plurality of reflector devices 102 may be controlled by the first RF device for transmission of the plurality of beams of RF signals to the second RF device, based on the second set of criteria. In accordance with an embodiment, the first microcontroller 104A in the base station 104 may be configured to control the remaining of the dynamically selected plurality of reflector devices 102, i.e. the first active reflector device 102A, the third active reflector device 102C, and the first passive reflector device 102D, based on the second set of criteria. The second set of criteria may correspond to power requirement request and other associated metadata, received from the second active reflector device 102B.

The active reflector devices from the remaining of the dynamically controlled plurality of reflector devices 102 may operate to perform beamforming and provide an optimized transmission of a plurality of beams of RF signals to the second active reflector device 102B. The transmission of the plurality of beams of RF signals may be robust to overcome a plurality of physical obstructing objects (such as the wall of the customer premises 108). Further, the determined NLOS radio path may be optimized, as described above, for the transmission of the plurality of beams of RF signals.

Once the optimal NLOS radio path is determined, the distributed transceivers 228A, which corresponds to various RF devices over the optimal NLOS radio path, utilize various transmission schemes, such as the MIMO transmission, for RF communication. Accordingly, the plurality of beams of RF signals are transmitted from the base station 104 to the one or more RF devices 232, via the second active reflector device 102B for example, in the most optimal manner exhibiting high network performance and maximum network coverage.

During the MIMO transmission, the baseband processor 224A may encode the data streams in the baseband based on various coding algorithms, such as space-time coding or space-time-frequency coding. The coded data streams in the baseband may be initially converted into different corresponding IF bands and then may be further up-converted to the same RF band. The baseband processor 224A may be configured to enable transmit beamforming for the MIMO transmission. Accordingly, each of the coded data stream in the same RF band, as the plurality of beams of RF signals, may be concurrently transmitted, via the antenna arrays 230A, at different directions or orientations over the plurality of distributed transceivers 228A of the base station 104 to the one or more RF devices 232, via the second active reflector device 102B over the determined NLOS.

At 308, the plurality of beams of RF signals may be transmitted by active reflector devices of the remaining of the controlled plurality of reflector devices 102 to the second RF device. In accordance with an embodiment, the remaining of the controlled plurality of reflector devices 102 may transmit a plurality of beams of RF signals to the second active reflector device 102B. The first active reflector device 102A and the third active reflector device 102C (single-beam or multi-beam active reflector devices) configured to perform a plurality of operations on the plurality of beams of RF signals before transmitting the plurality of beams of RF signals to second active reflector device 102B. Examples of the plurality of operations may include, but are not limited to, adjusting an amplitude gain, adjusting phase shift, performing beamforming to generate a plurality of beams of RF signals, and performing beam steering based on the phase shifting of the plurality of beams of RF signals to deflect the plurality of beams at a desired angle. The transmission of the plurality of beams of RF signals to at least the RF transmitter device and the RF receiver device, via distributed transmitters, such as the distributed transmitters 206 communicatively coupled with the first antenna array 202, may be in accordance with the MIMO transmission.

At 310, the plurality of beams of RF signals may be deflected by passive reflector devices of the remaining of the controlled plurality of reflector devices 102 at specified angle to the second RF device. In accordance with an embodiment, the first passive reflector device 102D may be configured to provide a deflection to incoming plurality of beams of RF signals towards the second active reflector device 102B without adjusting the amplitude gain and the phase shift of the plurality of beams of RF signals. The first passive reflector device 102D may provide the deflection based on various parameters, such as an incident angle, scan angle, and sizes of the first passive reflector device 102D.

It may be noted that the sequence of exemplary operations, as described at steps 308 and 310, should not be construed to be limiting the scope of the disclosure. The sequence of exemplary operations is based on the sequence of the reflector devices (for example, a passive reflector device follows an active reflector device) in the plurality of reflector devices 102 that when traversed, provides an optimum NLOS path in the multi-antenna array network. Notwithstanding, for other sequences of exemplary operations, based on other sequences of the reflector devices (for example, an active reflector device follows a passive reflector device), the sequence of steps may vary, without deviation from the scope of the disclosure. Furthermore, there may be another embodiment, according to which the steps 308 and 310 may be simultaneously performed, without deviation from the scope of the disclosure.

At 312, the deflected or transmitted beam of RF signals from the remaining of the controlled plurality of reflector devices 102 along the NLOS may be received at the second RF device. In accordance with an embodiment, the second active reflector device 102B may be configured to receive the plurality of beams of RF signals, via the corresponding second antenna array 204. The plurality of antenna elements 204A of the second antenna array 204 of the second active reflector device 102B may be configured to generate alternating current (AC) voltage or power signal based on the RF energy associated with the received plurality of beams of RF signals. The reception of the plurality of beams of RF signals from at least the RF transmitter device and the RF receiver device, via distributed receivers, such as the distributed receivers 208 communicatively coupled with the second antenna array 204, may be in accordance with the MIMO reception.

At 314, a first type of signal associated with plurality of RF signals received from dynamically selected RF devices at the second RF device may be converted to a second type of signal. In accordance with an embodiment, the one or more rectifier circuits 212 in the second active reflector device 102B may be configured to rectify the AC voltage or power signals generated by the plurality of antenna elements 204A to DC voltage or power signals. Further, the first boost convertor 216 may be configured to step-up the output of the one or more rectifier circuits 212, i.e. the DC voltage or power signals, into increased DC voltage or power signals.

At 316, transmission of the second type of signal to one or more electronic devices may be controlled at the second RF device based on the device characteristics of the associated one or more electronic devices or the second RF device. In accordance with an embodiment, the second boost converter 218 may be configured to stabilize the stepped-up DC voltage or power signals based on the device characteristics of the wearable smart device 220 or the second active reflector device 102B. In accordance with an embodiment, the second microcontroller 210 may regulate the DC voltage or power signals according to the device characteristics and contractual agreements undertaken by the user 222 of the wearable smart device 220. The second microcontroller 210, in conjunction with the second boost converter 218, may transmit the regulated, stabilized and continuous DC voltage or power signals to the battery or internal circuitry of wearable smart device 220. The wearable smart device 220 may utilize the received voltage or power for powering or charging or powering the battery or internal circuitry. In accordance with another embodiment, the second microcontroller 210 may regulate the DC voltage or power signals according to the device characteristics of the second active reflector device 102B. The second microcontroller 210, in conjunction with the second boost converter 218, may utilize the regulated, stabilized and continuous DC voltage or power signals for the internal battery or internal circuitry of the second active reflector device 102B.

Figure 4:
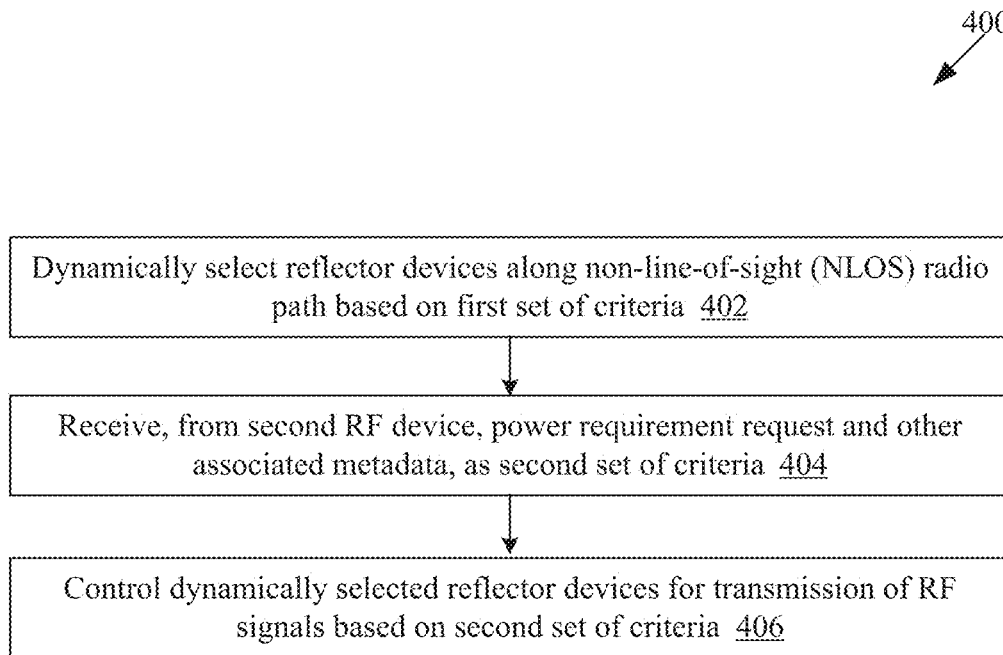
FIG. 4 depicts a flow chart illustrating exemplary operations of an exemplary RF device that selects and controls RF devices in RF device network, in accordance with an exemplary embodiment of the disclosure.

FIG. 4 depicts a flow chart illustrating exemplary operations of an exemplary RF device that selects and controls RF devices in RF device network, in accordance with an exemplary embodiment of the disclosure. The exemplary operations in FIG. 4 are explained in conjunction with FIGS. 1 and 2. Referring to FIG. 4, there is shown a flow chart 400 comprising exemplary operations 402 through 406.

It may be noted that FIG. 4 is explained based on the assumption that the first RF device is the base station 104 that may be configured to dynamically perform the following exemplary operations 402 through 406. However, it should not to be construed to be limiting the scope of the disclosure, and the same intelligence may be incorporated in external fixed devices (such as a central server), the plurality of reflector devices 102, or mobile devices that are associated with a user. In case of a mobile device, an app may be installed and executed to facilitate the configuration of the RF device network manually for selection of a combination of active and passive reflector devices for various locations. The app may further facilitate the combination and topology of active and passive reflector devices.

At 402, a plurality of reflector devices may be dynamically selected along NLOS radio path by the first RF device based on the first set of criteria. In accordance with an embodiment, the one or more circuits, such as the first microcontroller 104A, in the base station 104 may be configured to locate and dynamically select the plurality of reflector devices 102, such as the first active reflector device 102A, the second active reflector device 102B, the third active reflector device 102C, and the first passive reflector device 102D, along an NLOS radio path based on the first set of criteria. The first set of criteria for the dynamic selection of the plurality of reflector devices 102 may correspond to various instances that have been describe above in FIG. 1 and FIG. 2.

At 404, a power requirement request and associated metadata, as the second set of criteria, may be received from the second RF device at the first RF device. In accordance with an embodiment, the first microcontroller 104A of the base station 104 may be configured to receive the power requirement request and other associated metadata from one of the dynamically selected plurality of reflector devices 102, i.e. the second active reflector device 102B. In accordance with an embodiment, the second active reflector device 102B may receive the power requirement request from an associated electronic device, such as the wearable smart device 220. The electronic device may be identified by the second active reflector device 102B based on one or more of a unique IoT device identifier, a protocol based identifier, a device and protocol based identifier, a device behavior based identifier, image recognition, geo-location determined through RF beacons of other devices around, and the like. In accordance with another embodiment, the second active reflector device 102B may generate the power requirement request as the internal battery or the internal circuitry may be low on power.

At 406, the dynamically selected plurality of reflector devices may be controlled by the first RF device for transmission of the plurality of beams of RF signals to the second RF device, based on the second set of criteria. In accordance with an embodiment, the first microcontroller 104A in the base station 104 may be configured to control the remaining of the dynamically selected plurality of reflector devices 102, i.e. the first active reflector device 102A, the third active reflector device 102C, and the first passive reflector device 102D, based on the second set of criteria that corresponds to the power requirement request and other associated metadata of the wearable smart device 220, received from the second active reflector device 102B. In accordance with an embodiment, the first microcontroller 104A may be configured to control the dynamically selected one or more reflector devices based on a feedback channel (not shown) that may be utilized to exchange and negotiate system configurations, such as number of transceivers within RF devices, number of antennas per transceivers, antenna beamformers, channel responses, sequence of antenna array coefficients being evaluated, and/or locations of at least the one or more reflector devices.

As described in FIG. 3, active reflector devices from the dynamically controlled plurality of reflector devices 102 may operate to perform beamforming and provide an optimized transmission of a plurality of beams of RF signals to the second RF device. The transmission of the plurality of beams of RF signals may be robust to overcome a plurality of physical obstructing objects (such as the wall of the customer premises 108). Further, the determined NLOS radio path may be optimized, as described above, for the transmission of the plurality of beams of RF signals to the second RF device, such as the second active reflector device 102B.

Figure 5:
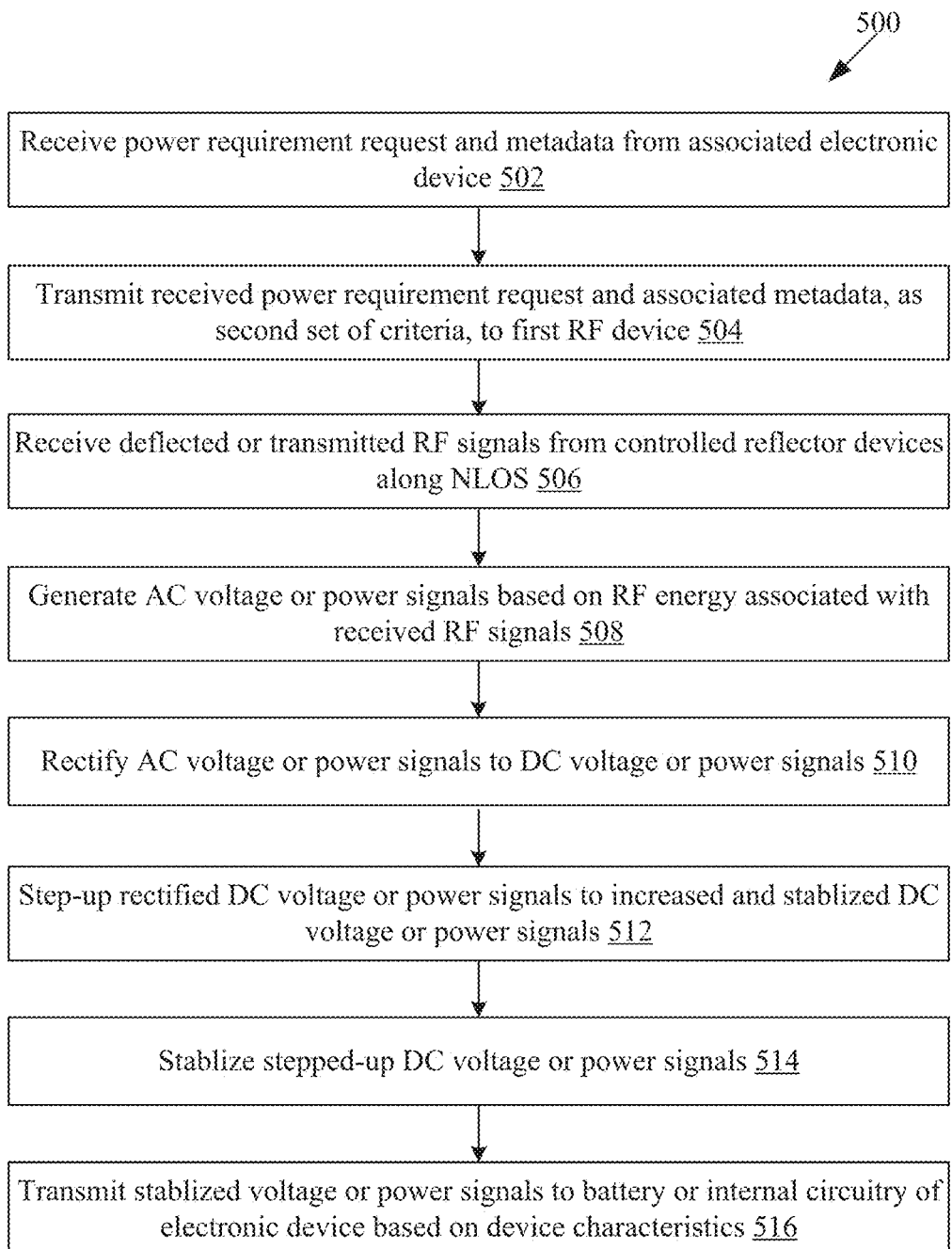
FIG. 5 depicts a flow chart illustrating exemplary operations of an exemplary RF device that controls power transmission for electronic devices in RF device network, in accordance with an exemplary embodiment of the disclosure.

FIG. 5 depicts a flow chart illustrating exemplary operations of an exemplary RF device that controls power transmission for electronic devices in RF device network, in accordance with an exemplary embodiment of the disclosure. The exemplary operations in FIG. 5 are explained in conjunction with FIGS. 1 and 2. Referring to FIG. 5, there is shown a flow chart 500 comprising exemplary operations 502 through 516.

It may be noted that FIG. 5 is explained based on the assumption that the second RF device is the second active reflector device 102B that may be configured to dynamically perform the following exemplary operations 502 through 516. However, it should not to be construed to be limiting the scope of the disclosure, and the same intelligence may be incorporated in other RF devices with associated one or more electronic devices that need to be charged or powered. In case of a mobile device, an app may be installed and executed to facilitate the management of power transmission to the associated one or more electronic devices.

At 502, a power requirement request may be received at the second RF device from associated electronic device. In accordance with an embodiment, the second active reflector device 102B may receive the power requirement request from an associated electronic device, such as the wearable smart device 220. The power requirement request may be in form of a real-time continuous or discrete data stream, non-real-time data, device sensor data, user-device interaction dataset, user reporting dataset, or any combination thereof including metadata thereof. The second microcontroller 210 of the second active reflector device 102B may be configured to identify the wearable smart device 220 based on one or more of the unique IoT device identifier, the protocol based identifier, the device and protocol based identifier, the device behavior based identifier, image recognition, the geo-location determined through RF beacons of other devices around, and the like.

At 504, received power requirement request and other associated metadata, as the second set of criteria, may be transmitted to the first RF device by the second RF device. In accordance with an embodiment, the second microcontroller 210 of the second active reflector device 102B, which is one of the dynamically selected plurality of reflector devices 102, may transmit the power requirement request and other associated metadata to the first microcontroller 104A of the base station 104. Based on the power requirement request and other associated metadata, as the second set of criteria, the first microcontroller 104A of the base station 104 may perform the exemplary operations 402 through 406, as described in FIG. 4.

At 506, the deflected or transmitted plurality of beams of RF signals may be received at the second RF device from the controlled plurality of reflector devices 102 along the NLOS. In accordance with an embodiment, as a result of the execution of the exemplary operations 402 through 406, as described in FIG. 4, the plurality of antenna elements 204A in the second antenna array 204 of the second active reflector device 102B may be configured to receive the plurality of beams of RF signals from the remaining of the dynamically controlled plurality of reflector devices 102. The reception of the plurality of beams of RF signals from at least the RF transmitter device and the RF receiver device, via distributed receivers, such as the distributed receivers 208 communicatively coupled with the second antenna array 204, may be in accordance with the MIMO reception.

At 508, AC voltage or power signals may be generated at the second RF device based on RF energy associated with received plurality of beams of RF signals. In accordance with an embodiment, the plurality of antenna elements 204A may be further configured to generate AC voltage or power signals based on the RF energy associated with the received plurality of beams of RF signals. The amplitude of the AC voltage or power signals may be based on characteristics and configuration of the transmitting RF devices, i.e. the first active reflector device 102A, the third active reflector device 102C, and the first passive reflector device 102D, and various environmental factors that may influence the propagation of the plurality of beams of RF signals in the RF device network.

At 510, the generated AC voltage or power signals may be rectified to DC voltage or power signals at the second RF device. In accordance with an embodiment, the one or more rectifier circuits 212 communicatively coupled with the plurality of antenna elements 204A in the second active reflector device 102B may be configured to rectify the AC voltage or power signals generated by the plurality of antenna elements 204A to DC voltage or power signals. The one or more rectifier circuits 212 may include a plurality of electronic components, such as diodes, resistors, inductors, and/or capacitors, configured for the voltage or power rectification.

At 512, the rectified DC voltage or power signals may be converted and stepped-up to increased and stabilized DC voltage or power signals at the second RF device. In accordance with an embodiment, the first boost convertor 216, such as a step-up DC-to-DC converter, may be configured to step-up the output of the one or more rectifier circuits 212, i.e. the DC voltage or power signals, into increased DC voltage or power signals. The output of the first boost convertor 216, i.e. the stepped-up DC voltage or power, may vary and reduced to zero or near zero values at one or more instants. Thus, the output of the first boost convertor 216 is buffered in the storage 214.

At 514, the stepped-up DC voltage or power signals may be stabilized at the second RF device. In accordance with an embodiment, the second boost converter 218 may be configured to stabilize the stepped-up DC voltage or power signals.

At 516, the stabilized voltage or power signals may be regulated and transmitted to battery or internal circuitry of the electronic device by the second RF device. In accordance with an embodiment, the second microcontroller 210 may regulate the DC voltage or power signals according to the device characteristics and contractual agreements undertaken by the user 222 of the wearable smart device 220. The second microcontroller 210, in conjunction with the second boost converter 218, may transmit the regulated, stabilized and continuous DC voltage or power signals to the battery or internal circuitry of wearable smart device 220. The wearable smart device 220 may utilize the received voltage or power for powering or charging the battery or the internal circuitry. In accordance with another embodiment, the second microcontroller 210 may regulate the DC voltage or power signals according to the device characteristics of the second active reflector device 102B. The second microcontroller 210, in conjunction with the second boost converter 218, may utilize the regulated, stabilized and continuous DC voltage or power signals for the internal battery or internal circuitry of the second active reflector device 102B.

Various embodiments of the disclosure may provide a non-transitory computer-readable medium having stored thereon, computer implemented instruction that when executed by a first RF device, such as the base station 104, in an RF device network, execute operations to in a first radio frequency (RF) device, may dynamically select a plurality of reflector devices, such as the first active reflector device 102A, the second active reflector device 102B, the third active reflector device 102C, and the first passive reflector device 102D, along a non-line-of-sight (NLOS) radio path based on the first set of criteria. The plurality of reflector devices may comprise at least an active reflector device and a passive reflector device. The first RF device may further control the dynamically selected plurality of reflector devices based on the second set of criteria. A plurality of RF signals transmitted by the controlled plurality of reflector devices 102 may be received at a second RF device, such as the second active reflector device 102B. A first type of signal, such as AC voltage or power signal, associated with the received plurality of RF signals may be converted to a second type of signal, such as DC voltage or power signal. Transmission of the second type of signal to one or more electronic devices, such as the wearable smart device 220, associated with the second RF device may be controlled based on one or more device characteristics of the one or more electronic devices or the second device.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU" or processor), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A system, comprising:
  a plurality of circuits in a first radio frequency (RF) device, wherein the plurality of circuits are configured to:
    determine a non-line-of-sight (NLOS) radio path;
    select a first plurality of reflector devices associated with the NLOS radio path from a second plurality of reflector devices,
      wherein the first plurality of reflector devices are selected based on a first set of criteria, and
      wherein the first plurality of reflector devices comprises an active reflector device and a passive reflector device; and
    control the first plurality of reflector devices to transmit a plurality of RF signals to a second RF device,
      wherein the first plurality of reflector devices are controlled based on a second set of criteria,
      wherein the second RF device is associated with one or more electronic devices,
      wherein a first RF signal of the plurality of RF signals interferes with a second RF signal of the plurality of RF signals,
      wherein a first type of signal associated with the plurality of RF signals is converted to a second type of signal at the second RF device, and
      wherein the second type of signal is transmitted by the second RF device to the one or more electronic devices.

2. The system according to claim 1,
  wherein the active reflector device is configured to perform beamforming based on adjustment of one or more signal parameters on an incoming plurality of RF signals,
  wherein the active reflector device is positioned at a distance from a physical obstructing object, and
  wherein the physical obstructing object partially blocks at least one of the incoming plurality of RF signals or an outgoing plurality of RF signals.

3. The system according to claim 1, wherein the passive reflector device is configured to deflect an incoming plurality of RF signals,
  wherein the incoming plurality of RF signals are deflected based on at least one of an incident angle of the passive reflector device, a scanning angle of the passive reflector device, or size of the passive reflector device, and wherein the passive reflector device is positioned at a distance from a physical obstructing object that completely blocks the incoming plurality of RF signals.

4. The system according to claim 1, wherein the one or more electronic devices correspond to Internet of Things (IOT) devices or mobile electronic devices.

5. The system according to claim 1, wherein the first type of signal associated with the plurality of RF signals corresponds to an AC signal and the second type of signal corresponds to a DC signal.

6. The system according to claim 1, wherein the second RF device comprises the one or more electronic devices.

7. The system according to claim 1, wherein the one or more electronic devices are external to the second RF device and the one or more electronic devices are further communicatively coupled with the second RF device.

8. The system according to claim 1, wherein the second type of signal is stepped-up and stabilized to control power transmission to the one or more electronic devices.

9. The system according to claim 1,
wherein the first set of criteria for the selection of the first plurality of reflector devices corresponds to at least one of a location of a reflector device of the first plurality of reflector devices, a relative distance of the reflector device with respect to the first RF device, a type of one or more physical obstructing objects, or one or more parameters measured at the first plurality of reflector devices, and
wherein the one or more parameters correspond to at least an antenna gain, a signal-to-noise ratio (SNR), a signal-to-interference-plus-noise ratio (SINR), a carrier-to-noise (CNR), or a carrier-to-interference-and-noise ratio (CINR).

10. The system according to claim 1,
wherein the second set of criteria corresponds to at least one of a power requirement request received from the one or more electronic devices, a type or make of the one or more electronic devices, unique identification of the one or more electronic devices, profiles of the one or more electronic devices, or priority level of the one or more electronic devices.

11. The system according to claim 1,
wherein the second RF device comprises distributed transmitters and receivers, wherein the distributed transmitters transmit a first set of beams of RF signals in accordance with multiple-input multiple-output (MIMO) transmission, and
wherein the distributed receivers receive a second set of beams of RF signals in accordance with MIMO reception.

12. The system according to claim 1,
wherein the second RF device comprises a plurality of distributed transceivers, and
wherein the plurality of distributed transceivers transmits and receives a plurality of beams of RF signals in accordance with multiple-input multiple-output (MIMO) transmission and MIMO reception.

13. The system according to claim 1,
wherein the plurality of circuits in the first RF device are further configured to control the selected first plurality of reflector devices based on feedback information, and
wherein the feedback information is received by the first RF device via a feedback.

14. The system according to claim 13,
wherein the feedback information is associated with exchange of system configurations and negotiation of system configurations, and
wherein the feedback information comprises at least one of number of transceivers within one or more RF devices, number of antennas per transceiver, antenna beamformers channel responses, sequence of antenna array coefficients, or location of at least one of the first plurality of reflector devices.

15. The system according to claim 1, wherein the plurality of circuits are further configured to determine the NLOS radio path based on at least one of a shortest radio path, optimum signal level, maximum bitrate, access speed, highest throughput, presence of interference sources, or a type of obstructing physical object.

16. The system according to claim 1, wherein the transmission of the second type of signal is based on one or more device characteristics.

17. The system according to claim 16, wherein the one or more device characteristics comprises at least one of impedance of the second RF device, current power level of the second RF device, threshold power level of the second RF device, priority level of the second RF device, or power requirement of the second RF device.

18. A system, comprising:
a plurality of circuits in a radio frequency (RF) device, wherein the plurality of circuits are configured to:
receive a plurality of RF signals from a controlled plurality of reflector devices,
wherein a selection of the controlled plurality of reflector devices from a plurality of reflector devices is based on a first set of criteria,
wherein the plurality of RF signals are received based on a second set of criteria, and
wherein a first RF signal of the received plurality of RF signals interferes with a second RF signal of the received plurality of RF signals;
convert a first type of signal associated with the received plurality of RF signals to a second type of signal; and
control the RF device to transmit the second type of signal to one or more electronic devices.

19. The system according to claim 18, wherein the plurality of circuits in the RF device is further configured to generate the first type of signal based on RF waves in the received plurality RF signals.

20. The system according to claim 18, wherein the transmission of the second type of signal to the one or more electronic devices is based on one or more device characteristics.

21. The system according to claim 18, wherein the conversion of the first type of signal to the second type of signal comprises at least one of rectification of the first type of signal to the second type of signal or stepping-up of the second type of signal.

22. The system according to claim 21, wherein the plurality of circuits in the RF device are further configured to stabilize and
regulate the stepped-up second type of signal, wherein the stepped-up second type of signal is stabilized and regulated based on one or more device characteristics, and
wherein the one or more device characteristics are associated with the one or more electronic devices or the RF device.

23. The system according to claim 22, wherein the one or more device characteristics correspond to at least an impedance of the one or more electronic devices, current power level of the one or more electronic devices, threshold power level of the one or more electronic devices, priority level of the one or more electronic devices, or power requirements of the one or more electronic devices.

24. A system, comprising:
a first plurality of circuits in a first radio frequency (RF) device, wherein the first plurality of circuits are configured to:
determine a non-line-of-sight (NLOS) radio path;
select a first plurality of reflector devices associated with the NLOS radio path from a second plurality of reflector devices,
wherein the first plurality of reflector devices are selected based on a first set of criteria,
wherein the first plurality of reflector devices comprises at least one of an active reflector device or a passive reflector device;
control the selected first plurality of reflector devices based on a second set of criteria;
a second plurality of circuits in a second RF device associated with one or more electronic devices, wherein the second plurality of circuits are configured to:
receive a plurality of RF signals from the controlled plurality of reflector devices,
wherein a first RF signal of the received plurality of RF signals interferes with a second RF signal of the received plurality of RF signals;
convert a first type of signal associated with the received plurality of RF signals to a second type of signal; and
control the second RF device to transmit the second type of signal to the one or more electronic devices.

25. A non-transitory computer-readable medium having stored thereon, computer executable instructions that when executed by a computer, cause the computer to execute instructions, the instructions comprising:
in a radio frequency (RF) device:
receiving a plurality of RF signals from a controlled plurality of reflector devices,
wherein a selection of the controlled plurality of reflector devices is based on a first set of criteria,
wherein the plurality of RF signals are received based on a second set of criteria,
wherein a first RF signal of the received plurality of RF signals interferes with a second RF signal of the received plurality of RF signals;
converting a first type of signal associated with the received plurality of RF signals to a second type of signal; and
controlling the RF device to transmit the second type of signal to one or more electronic devices.

* * * * *